US012285942B2

(12) United States Patent
Ryu et al.

(10) Patent No.: US 12,285,942 B2
(45) Date of Patent: Apr. 29, 2025

(54) INKJET PRINTING APPARATUS AND METHOD FOR PRINTING USING THE SAME

(71) Applicant: Samsung Display Co., LTD., Yongin-si (KR)

(72) Inventors: Jeyun Ryu, Yongin-si (KR); Jae Seok Park, Yongin-si (KR); Satoshi Tomoeda, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 258 days.

(21) Appl. No.: 18/110,431

(22) Filed: Feb. 16, 2023

(65) Prior Publication Data

US 2023/0382104 A1 Nov. 30, 2023

(30) Foreign Application Priority Data

May 31, 2022 (KR) ........................ 10-2022-0066816

(51) Int. Cl.
*B41J 2/045* (2006.01)
*B41J 2/21* (2006.01)

(52) U.S. Cl.
CPC ....... *B41J 2/04508* (2013.01); *B41J 2/04586* (2013.01); *B41J 2/2132* (2013.01); *B41J 2/2146* (2013.01); *B41J 2202/09* (2013.01)

(58) Field of Classification Search
CPC .. B41J 2/04508; B41J 2/04586; B41J 2/2132; B41J 2/2146; B41J 2202/09; B41J 25/003; B41J 2/21; B41J 2/07; B41J 29/393; B41J 2203/01; B41M 5/0047
See application file for complete search history.

(56) References Cited

U.S. PATENT DOCUMENTS

| | | | |
|---|---|---|---|
| 11,110,730 B2 | 9/2021 | Kim et al. | |
| 2020/0361210 A1* | 11/2020 | Sato | G06N 3/084 |

FOREIGN PATENT DOCUMENTS

| | | |
|---|---|---|
| JP | 5458474 | 4/2014 |
| JP | 5603185 | 10/2014 |
| JP | 5785935 | 9/2015 |
| KR | 10-2020-0053056 | 5/2020 |
| KR | 10-2023-0023099 | 2/2023 |

* cited by examiner

*Primary Examiner* — Thinh H Nguyen
(74) *Attorney, Agent, or Firm* — KILE PARK REED & HOUTTEMAN PLLC

(57) ABSTRACT

An inkjet printing apparatus includes: an inkjet head including nozzles that discharge an ink; and a controller that controls to discharge the ink by the nozzles. The controller includes: a nozzle coordinate analyzer that analyzes coordinates of the nozzles based on a substrate; a nozzle selection probability grantor that assigns a nozzle selection probability the nozzles that how likely the nozzles are selected to discharge the ink; and an ink discharge determinator that determines whether to discharge the ink or not based on the nozzle selection probability.

20 Claims, 15 Drawing Sheets

FIG. 8

| | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 | 0 | 0 | 0 | 0 | 0 | 0 | 0 | 0 | 0 | 0 | 0 | 0 | 0 | 0 | 0 | 0 |
| 2 | 0 | 0 | 0 | 0 | 0 | 0 | 0 | 0 | 0 | 0 | 0 | 0 | 0 | 0 | 0 | 0 |
| 3 | 0 | 0 | 0 | 1 | 0 | 0 | 0 | 0 | 0 | 0 | 0 | 0 | 0 | 0 | 0 | 0 |
| 4 | 0 | 0 | 1 | 1 | 1 | 0 | 0 | 0 | 0 | 0 | 0 | 0 | 0 | 0 | 0 | 0 |
| 5 | 0 | 1 | 1 | 1 | 1 | 1 | 0 | 0 | 0 | 0 | 0 | 0 | 0 | 0 | 0 | 0 |
| 6 | 0 | 1 | 1 | 1 | 1 | 1 | 0 | 0 | 0 | 0 | 0 | 0 | 0 | 0 | 0 | 0 |
| 7 | 0 | 0 | 1 | 1 | 1 | 0 | 0 | 0 | 0 | 0 | 0 | 0 | 0 | 0 | 0 | 0 |
| 8 | 0 | 0 | 0 | 1 | 0 | 0 | 0 | 0 | 0 | 0 | 0 | 0 | 0 | 0 | 0 | 0 |
| 9 | 0 | 0 | 0 | 0 | 0 | 0 | 0 | 0 | 0 | 0 | 0 | 0 | 0 | 0 | 0 | 0 |
| 10 | 0 | 0 | 0 | 0 | 0 | 0 | 0 | 0 | 0 | 0 | 1 | 0 | 0 | 0 | 0 | 0 |
| 11 | 0 | 0 | 0 | 0 | 0 | 0 | 0 | 0 | 0 | 1 | 1 | 1 | 0 | 0 | 0 | 0 |
| 12 | 0 | 0 | 0 | 0 | 0 | 0 | 0 | 0 | 1 | 1 | 1 | 1 | 1 | 0 | 0 | 0 |
| 13 | 0 | 0 | 0 | 0 | 0 | 0 | 0 | 0 | 1 | 1 | 1 | 1 | 1 | 0 | 0 | 0 |
| 14 | 0 | 0 | 0 | 0 | 0 | 0 | 0 | 0 | 0 | 1 | 1 | 1 | 0 | 0 | 0 | 0 |
| 15 | 0 | 0 | 0 | 0 | 0 | 0 | 0 | 0 | 0 | 0 | 1 | 0 | 0 | 0 | 0 | 0 |
| 16 | 0 | 0 | 0 | 0 | 0 | 0 | 0 | 0 | 0 | 0 | 0 | 0 | 0 | 0 | 0 | 0 |

D1

D2

INKJET PRINTING APPARATUS AND METHOD FOR PRINTING USING THE SAME

CROSS-REFERENCE TO RELATED APPLICATION(S)

This application claims priority to and the benefits of Korean Patent Application No. 10-2022-0066816 under 35 U.S.C. § 119, filed on May 31, 2022, in the Korean Intellectual Property Office (KIPO), the entire contents of which are incorporated herein by reference.

BACKGROUND

1. Technical Field

Embodiments relate to an inkjet printing apparatus and an inkjet printing method using the inkjet printing apparatus.

2. Description of the Related Art

An inkjet printing system is used in a manufacturing process of electronic devices. For example, in manufacturing a display device such as an emissive display device and a liquid crystal display, patterns such as a color filter layer, a color conversion layer, and an emission layer is formed by using an inkjet printing apparatus.

An inkjet printing apparatus may include an inkjet head in which nozzles are arranged. By discharging ink through the nozzles with moving the inkjet head, a certain pattern may be printed on a substrate. For example, a lot of time and a large amount of memory may be required to derive data on whether each nozzle discharges the ink at a certain position on the substrate. For example, there is a limitation in temporally dispersing the nozzles selected to discharge the ink unless an additional calculation is performed during the nozzle selection calculation.

SUMMARY

Embodiments provide an inkjet printing apparatus and an inkjet printing method by using the inkjet printing apparatus, which are capable of shortening or reducing a time for deriving information on whether or not ink is discharged according to the position of the nozzle in the inkjet printing process and reducing a capacity of a memory.

Embodiments provide an inkjet printing apparatus capable of distributing nozzle selection over a swath without performing a separate operation and an inkjet printing method by using the inkjet printing apparatus.

However, embodiments of the disclosure are not limited to those set forth herein. The above and other embodiments will become more apparent to one of ordinary skill in the art to which the disclosure pertains by referencing the detailed description of the disclosure given below.

An inkjet printing apparatus according to an embodiment may include: an inkjet head including nozzles that discharge ink; and a controller that controls to discharge the ink by the nozzles. The controller may include: a nozzle coordinate analyzer that analyzes coordinates of the nozzles based on a substrate; a nozzle selection probability grantor that assigns a nozzle selection probability of the nozzles, the nozzle selection probability that how likely the nozzles are selected to discharge the ink; and an ink discharge determinator that determines whether to discharge the ink or not based on the nozzle selection probability.

The nozzle coordinate analyzer may determine a number of swaths and a number of ink discharge nozzles required to form patterns based on the coordinates of the nozzles and information of a pattern to be formed on the substrate.

The nozzle selection probability grantor may generate a nozzle selection probability map for each swath by assigning a nozzle selection probability for each swath, and transmits the nozzle selection probability map to the ink discharge determinator.

The nozzle selection probability per swath may be based on the number of the swaths.

The nozzle selection probability for each swath may be set individually for each swath within a range that increases or decreases the number of the swaths by about ±30%.

The patterns may be patterns of pixels. The nozzle selection probability grantor may generate a nozzle selection probability map for each pixel by assigning a nozzle selection probability to each pixel, and transmits the nozzle selection probability map to the ink discharge determinator.

The nozzle selection probability for each pixel may be based on a value obtained by dividing the number of the nozzles discharging the ink required for forming the patterns of the pixels by the number of the nozzles allocated over the swaths.

The nozzle selection probability for each pixel may be set differently for each swath within a range that increases or decreases a value obtained by dividing the number of ink discharge nozzles required for forming the patterns of the pixels by the number of nozzles allocated over the swaths by about ±30%.

The nozzle coordinate analyzer may calculate which the nozzles are assigned to form the pattern and generate an ink drop map for a region of the substrate corresponding to each swath to be transmitted to the ink discharge determinator.

The ink discharge determinator may determine whether to drop the ink based on the ink drop map and the nozzle selection probability map.

An inkjet printing method according to an embodiment may include: analyzing coordinates of nozzles based on a substrate; assigning a nozzle selection probability of the nozzles, the nozzle selection probability that how likely the nozzles are selected to discharge ink; and determining whether to discharge the ink or not based on the nozzle selection probability.

The analyzing of the coordinates of the nozzles may include determining a number of swaths and a number of ink discharge nozzles required to form patterns based on the coordinates of the nozzles and information of a pattern to be formed on the substrate.

The assigning of the nozzle selection probability may include generating a nozzle selection probability map for each swath by assigning a nozzle selection probability to each swath.

The nozzle selection probability per swath may be based on the number of the swaths.

The nozzle selection probability for each swath may be set individually for each swath within the range that increases or decreases the number of the swaths by about ±30%.

The patterns may be patterns of pixels, and the granting of the nozzle selection probability may include generating a nozzle selection probability map for each pixel by assigning the nozzle selection probability to each pixel.

The nozzle selection probability for each pixel may be based on a value obtained by dividing the number of the nozzles discharging the ink required for forming the patterns of the pixels by the number of the nozzles allocated over the swaths.

The nozzle selection probability for each pixel may be set differently for each swath within a range that increases or decreases a value obtained by dividing the number of ink discharge nozzles required for forming the patterns of the pixels by the number of nozzles allocated over the swaths by about ±30%.

The analyzing of the coordinate of the nozzles may include generating an ink drop map for the region of the substrate corresponding to each swath by calculating the nozzles assigned to the pattern to be formed.

The determining whether to discharge the ink or not may include determining whether to drop the ink based on the ink drop map and the nozzle selection probability map.

According to embodiments, in the inkjet printing process, the time for deriving information on whether or not ink is discharged according to the position of the nozzle may be shorten or reduced, and the capacity of the memory may be reduced. Further, the nozzle selection may be prevented from being concentrated on the initial swath without performing a separate calculation, and to disperse the nozzle selection over the swaths.

BRIEF DESCRIPTION OF THE DRAWINGS

FIG. 8 is a first unit region ink drop map showing a position where a first color ink is dropped.

DETAILED DESCRIPTION OF THE EMBODIMENTS

Figure 1:
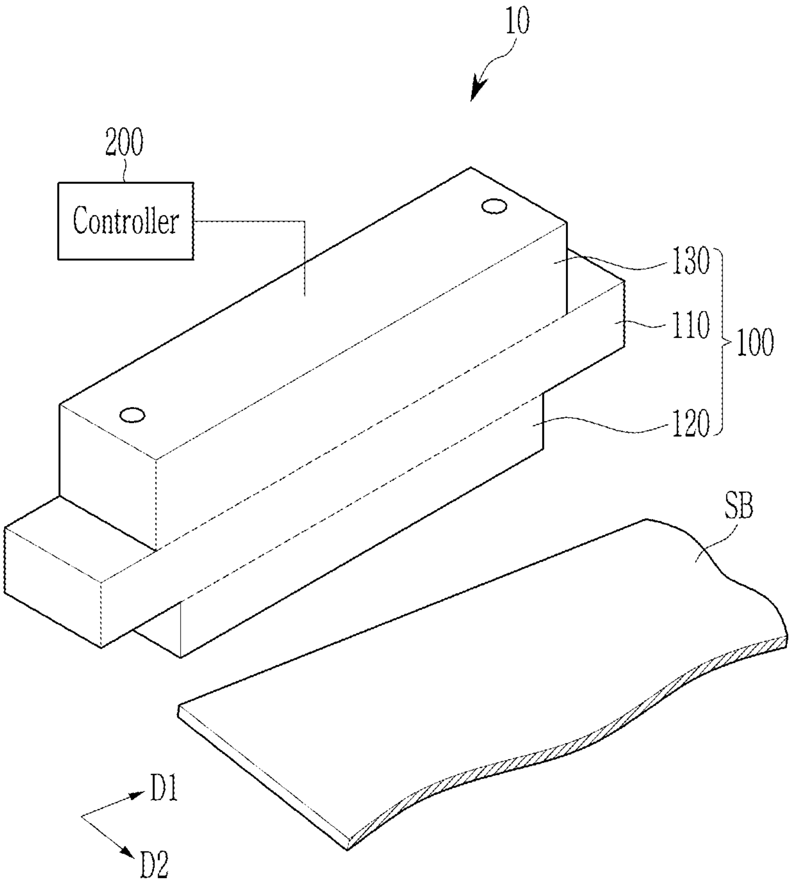
FIG. 1 is a schematic perspective view showing an inkjet printing apparatus according to an embodiment.

In the following description, for the purposes of explanation, numerous specific details are set forth in order to provide a thorough understanding of various embodiments or implementations of the invention. As used herein "embodiments" and "implementations" are interchangeable words that are non-limiting examples of devices or methods disclosed herein. It is apparent, however, that various embodiments may be practiced without these specific details or with one or more equivalent arrangements. Here, various embodiments do not have to be exclusive nor limit the disclosure. For example, specific shapes, configurations, and characteristics of an embodiment may be used or implemented in another embodiment.

Unless otherwise specified, the illustrated embodiments are to be understood as providing features of the invention. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the invention.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the X, Y, and Z-axes, and may be interpreted in a broader sense. For example, the D1-axis, the D2-axis, and the D3-axis may be perpendicular to one another, or may represent different directions that are not perpendicular to one another. Further, the X-axis, the Y-axis, and the Z-axis are not limited to three axes of a rectangular coordinate system, such as the x, y, and z axes, and may be interpreted in a broader sense. For example, the X-axis, the Y-axis, and the Z-axis may be perpendicular to one another, or may represent different directions that are not perpendicular to one another. For the purposes of this disclosure, "at least one of A and B" may be construed as understood to mean A only, B only, or any combination of A and B. Also, "at least one of X, Y, and Z" and "at least one selected from the group consisting of X, Y, and Z" may be construed as X only, Y only, Z only, or any combination of two or more of X, Y, and Z. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as “beneath,” “below,” “under,” “lower,” “above,” “upper,” “over,” “higher,” “side” (e.g., as in “sidewall”), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as “below” or “beneath” other elements or features would then be oriented “above” the other elements or features. Thus, the term “below” can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, “a,” “an,” and “the” are intended to include the plural forms as well, unless the context clearly indicates otherwise. Moreover, the terms “comprises,” “comprising,” “includes,” and/or “including,” when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms “substantially,” “about,” and other similar terms, are used as terms of approximation and not as terms of degree, and, as such, are utilized to account for inherent deviations in measured, calculated, and/or provided values that would be recognized by one of ordinary skill in the art.

Various embodiments are described herein with reference to sectional and/or exploded illustrations that are schematic illustrations of embodiments and/or intermediate structures. As such, variations from the shapes of the illustrations as a result, for example, of manufacturing techniques and/or tolerances, are to be expected. Thus, embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some embodiments may be physically separated into two or more interacting and discrete blocks, units, and/or modules without departing from the scope of the invention. Further, the blocks, units, and/or modules of some embodiments may be physically combined into more complex blocks, units, and/or modules without departing from the scope of the invention.

Figure 2:
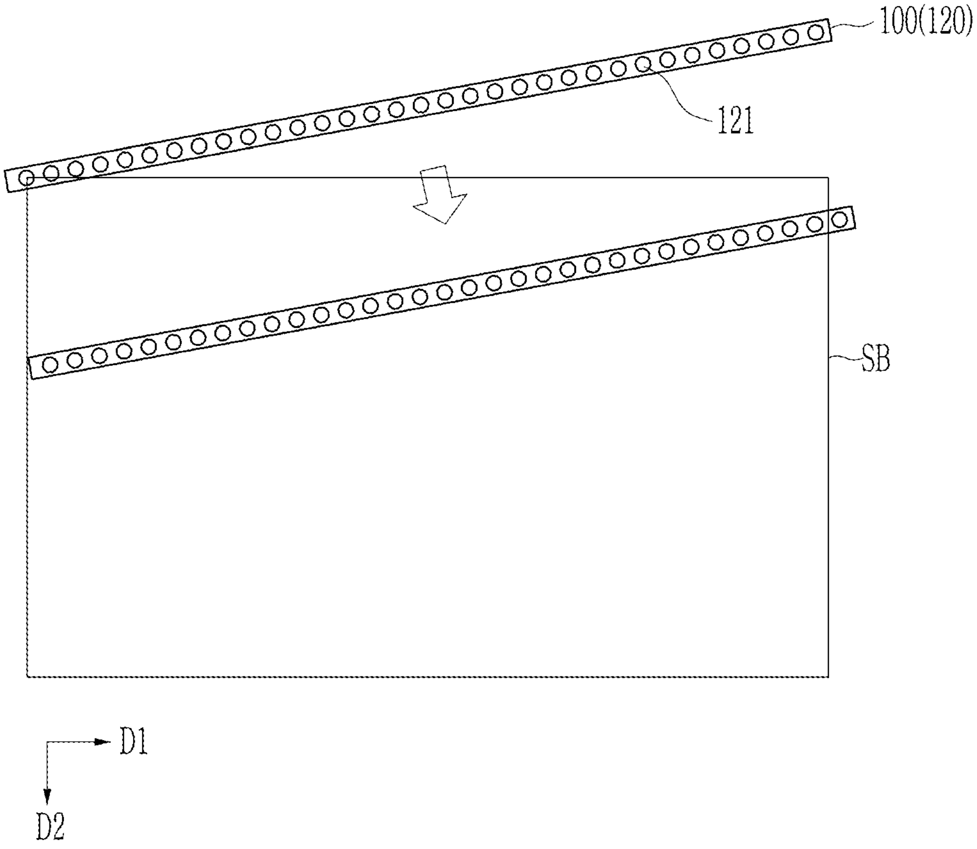
FIG. 2 is a schematic perspective view showing an inkjet head of an inkjet printing apparatus according to an embodiment.

FIG. 1 is a schematic perspective view showing an inkjet printing apparatus according to an embodiment, and FIG. 2 is a schematic perspective view showing an inkjet head of an inkjet printing apparatus according to an embodiment.

Referring to FIG. 1 and FIG. 2, an inkjet printing apparatus 10 may include an inkjet head 100 and a controller 200.

The inkjet head 100 may include a main body 110, a nozzle unit 120, and an ink storing unit 130. The main body 110 may function as a frame for the inkjet head 100. Although shown in a form of a square column, the main body 110 may have various shapes. The nozzle unit 120 may be positioned under the main body 110. The nozzle unit 120 may include a nozzle 121. The nozzles 121 may be protruded downward from the main body 110 or may be provided in a form of holes or openings in the nozzle plate. The nozzle unit 120 may include a piezoelectric element or a heater capable of pushing (or injecting) ink through the nozzles 121. The ink storing unit 130 may accommodate an ink composition to be dropped onto the substrate SB that is a print target through the nozzles 121 of the nozzle unit 120. In another example, the ink storing unit 130 may be implemented separately from the inkjet head 100.

The controller 200 may be connected (e.g., electrically connected) to the inkjet head 100. The controller 200 may control the overall operation of the inkjet printing apparatus 10. For example, the controller 200 may control the nozzle unit 120 to discharge the ink through the nozzles 121. The controller 200 may control the inkjet head 100 to move in the first direction D1 and the second direction D2.

Referring to FIG. 2, the inkjet head 100 and the nozzle unit 120 may have a rod shape extending in a direction when viewed from a planar or rear of the inkjet head 100. The nozzles 121 may be disposed apart along the length direction (or extending direction) of the inkjet head 100. The spacing between the nozzles 121 may be constant. In another example, the spacing between the nozzles 121 may not be constant. The nozzles 121 may be disposed in a single line, but may also be disposed in two or more lines. Each nozzle 121 may discharge the ink in a direction perpendicular to the substrate SB, but may also discharge the ink in an oblique direction. The number, spacing, and size of the nozzles 121 may be changed in various ways, and a printing resolution may vary according to the number, spacing, and/or size of the nozzle 121.

The substrate SB may have a plane shape of a quadrangle including two sides parallel to the first direction D1 and two sides parallel to the second direction D2. The first direction D1 and the second direction D2 may be perpendicular. The inkjet head 100 may extend in an oblique direction with respect to the first direction D1 and the second direction D2. The inkjet head 100 may move in a direction perpendicular to the extension direction of the inkjet head 100. For example, the inkjet head 100 may move in an oblique direction with respect to the first direction D1 and the second direction D2. The arrangement and movement direction of the inkjet head 100 may be changed in various ways. For example, the inkjet head 100 may extend in a direction parallel to the first direction D1 and may move in a second direction D2. The inkjet head 100 may extend in a direction parallel to the second direction D2 or may move in a first direction D1.

In case that the inkjet head 100 extends in the direction parallel to the first direction D1 or the second direction D2, among the nozzles 121, the used nozzles 121 (e.g., ink discharging nozzles) and the unused nozzles 121 (e.g., ink non-discharging nozzles) may be distinguished. For example, in case that the color filters of the pixels are formed on the substrate SB, the nozzles 121 corresponding to (or overlapping) the region, in which the color filters are formed, may be continuously used, and the nozzles 121 corresponding to (or overlapping) the region, in which the color filters are not formed, may not be continuously used. According to an embodiment, by disposing and moving the inkjet head 100 of the inkjet printing apparatus 10 in an oblique direction with respect to the side of the substrate SB, the using efficiency of the nozzles 121 may be improved. However, an algorithm for determining whether the ink for the nozzles 121 is discharged may be more complicated than in a case of disposing and moving parallel to the side of the substrate SB.

Figure 3:
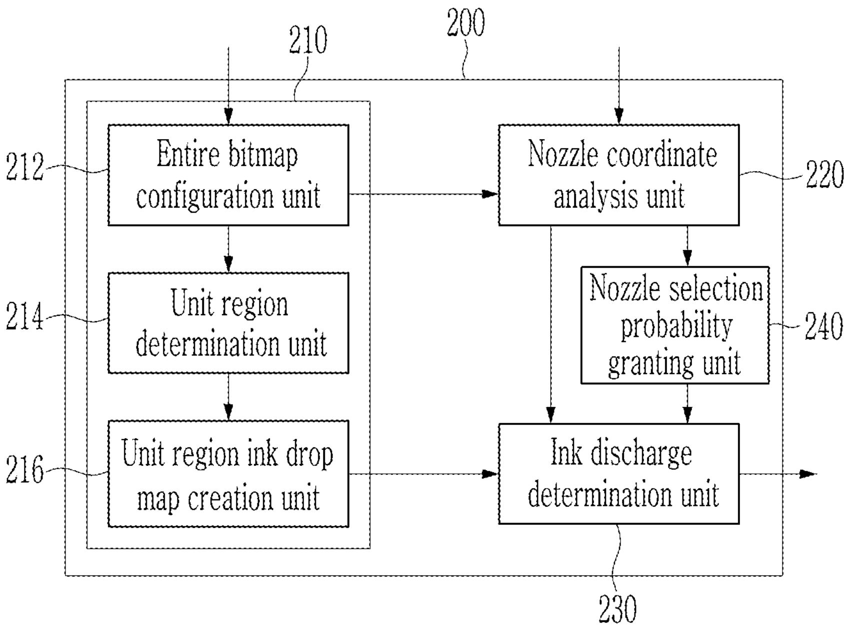
FIG. 3 is a block diagram of a controller of an inkjet printing apparatus according to an embodiment.
Figure 4:
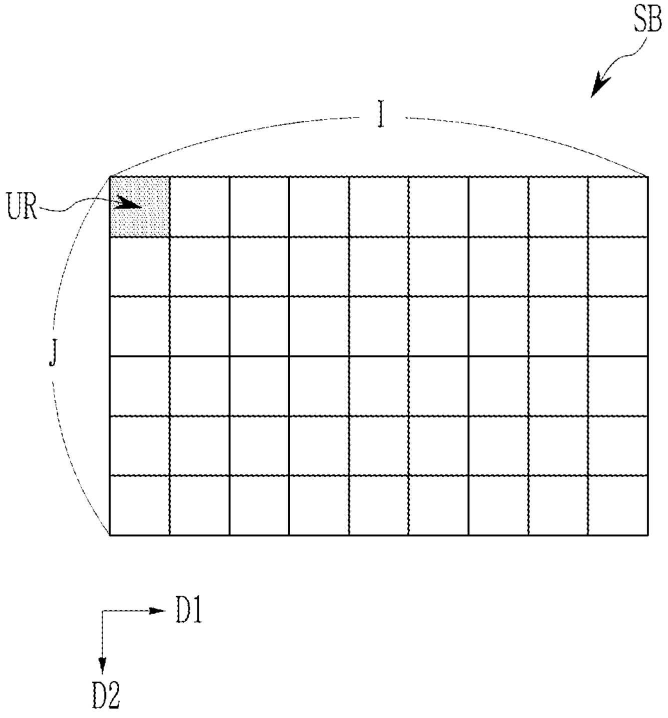
FIG. 4 is a schematic top plan view of a substrate that is a printing target of an inkjet printing apparatus according to an embodiment.
Figure 5:
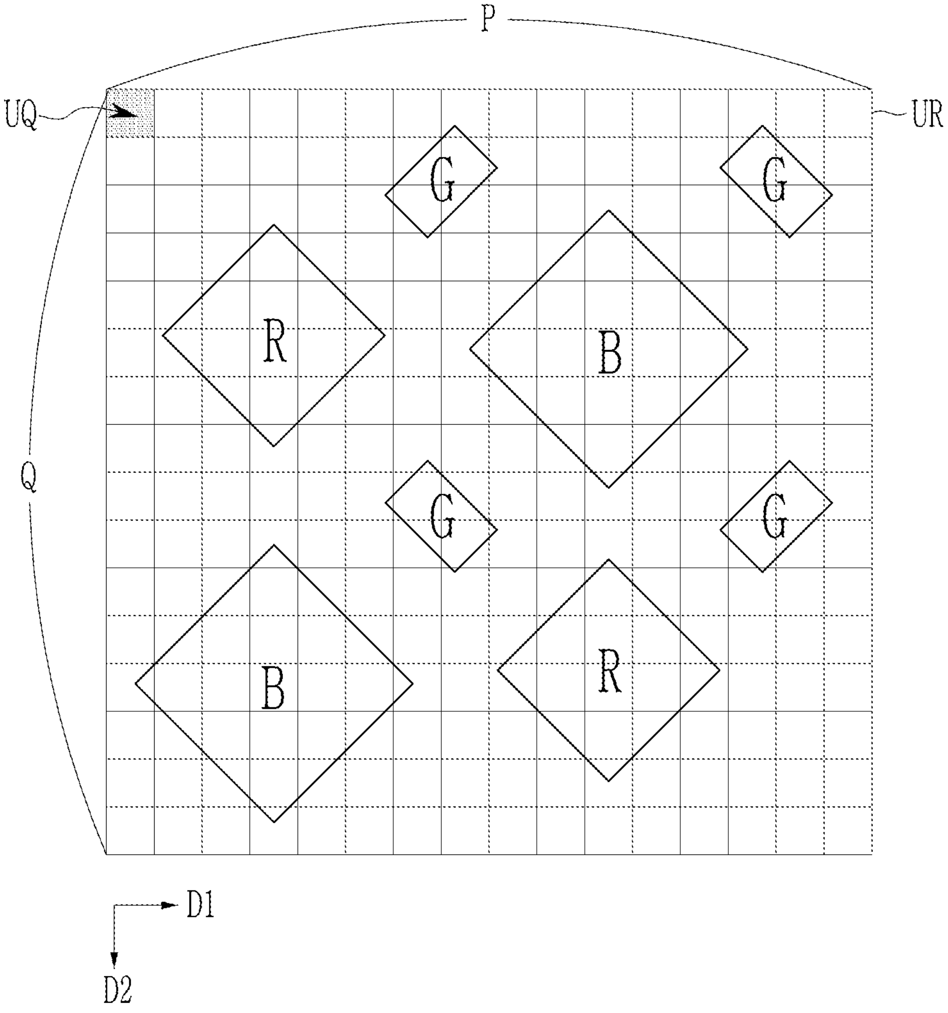
FIG. 5 is a schematic top plan view showing a unit region of a substrate that is a printing target of an inkjet printing apparatus according to an embodiment.
Figure 6:
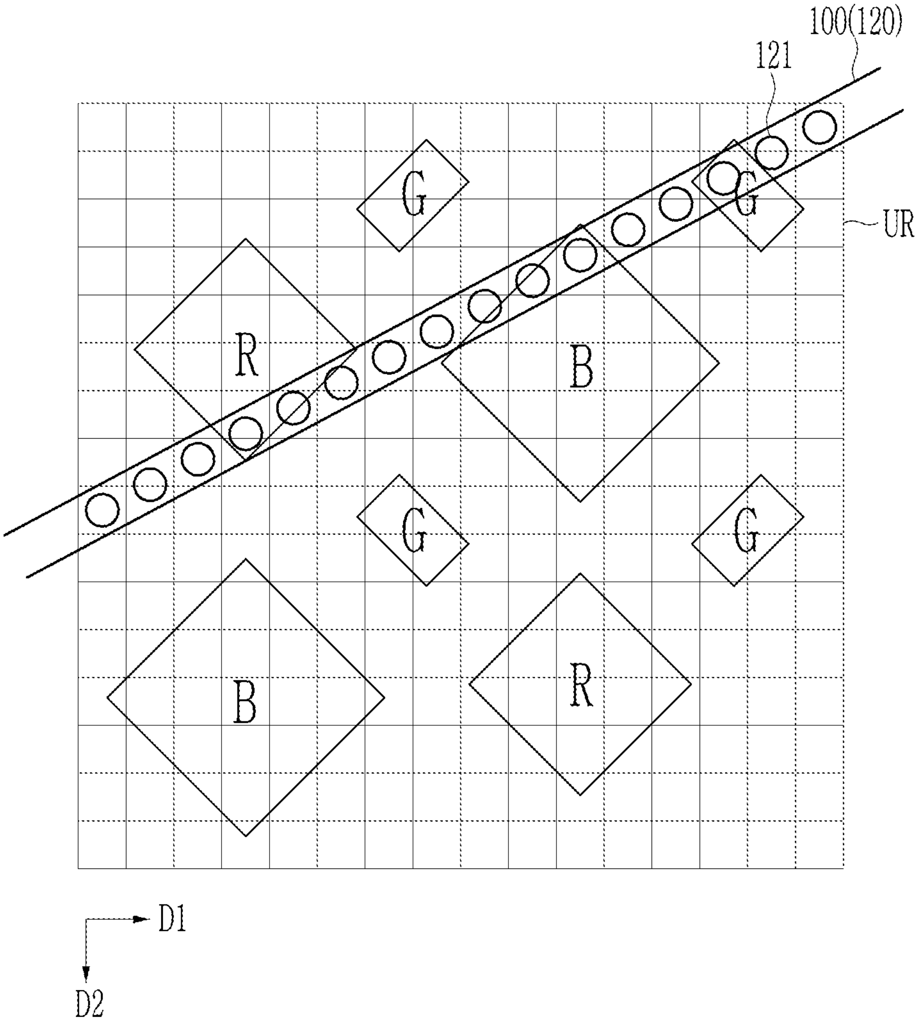
FIG. 6 is a schematic top plan view showing together an inkjet printing apparatus and a unit region of a substrate according to an embodiment.
Figure 7:
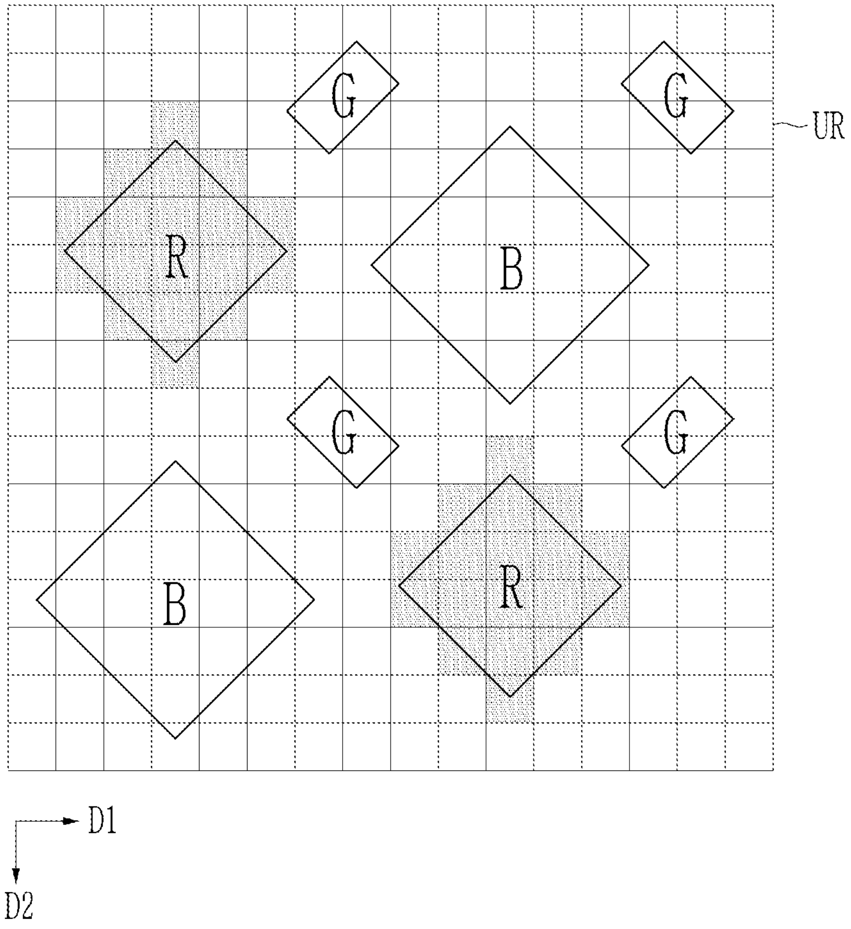
FIG. 7 is a schematic top plan view showing a region where a first color ink is dropped in a unit region of a substrate.

FIG. 3 is a block diagram of a controller of an inkjet printing apparatus according to an embodiment. FIG. 4 is a schematic top plan view of a substrate that is a printing target of an inkjet printing apparatus according to an embodiment, FIG. 5 is a schematic top plan view showing a unit region of a substrate that is a printing target of an inkjet printing apparatus according to an embodiment, and FIG. 6 is a schematic top plan view showing an inkjet printing apparatus and a unit region of a substrate according to an embodiment together. FIG. 7 is a schematic top plan view showing a region where a first color ink is dropped in a unit region of a substrate, and FIG. 8 is a first unit region ink drop map showing a position where a first color ink is dropped.

By simplifying the algorithm for determining whether the nozzles 121 discharge the ink or not, the controller 200 may shorten the time to derive information about the ink discharge and reduce the memory capacity. The controller 200 may include a pre-processing unit 210 that analyzes the pattern on the substrate SB, which is a printing target, a nozzle coordinate analysis unit (or a nozzle coordinator analyzer) 220 that analyzes the position of the nozzles 121, and an ink discharge determination unit (or an ink discharge determinator) 230 that determines whether the nozzles 121 discharge the ink. The controller 200 may further include a nozzle selection probability granting unit (or a nozzle selection probability grantor) 240 that assigns a nozzle selection probability per each swath or per each pixel. For example, the nozzle section probability may be how likely the nozzles are selected to discharge the ink.

The pre-processing unit 210 may include an entire bitmap configuration unit 212 that composes the substrate SB as an entire bitmap and stores the coordinates of each position, a unit region determination unit 214 that specifies a unit region by analyzing a repeating pattern on the substrate SB, and a unit region ink drop map creation unit 216 that composes a unit region as a unit bitmap and generates a unit region ink drop map by determining whether to drop the ink for each position on the unit bitmap.

The entire bitmap configuration unit 212 may divide the substrate SB into a lattice shape along the first direction D1 and the second direction D2. For example, the substrate SB may be divided into regions on a quadrangle including two sides parallel to the first direction D1 and two sides parallel to the second direction D2. For example, the position of each region may be represented by unique coordinates according to the order of the first direction D1 and the second direction D2. The first direction D1 may be a row direction (e.g., a horizontal direction), and the second direction D2 may be a column direction (e.g., a vertical direction). Each coordinate may be expressed as a binary number. For example, the coordinates of the region positioned in a row 1 and a column 1 may be expressed as (0, 0), the coordinates of the region positioned in the row 1 and the column 2 may be expressed as (0, 01), the coordinates of the region positioned in the row 1 and the column 3 may be expressed as (0, 10), and the coordinates of the region positioned in the row 1 and the column 4 may be expressed as (0, 11). The coordinates of the region positioned in the row 2 and the column 1 may be expressed as (01, 0), the coordinates of the region positioned in the row 2 and the column 2 may be expressed as (01, 01), the coordinates of the region positioned in the row 2 and the column 3 may be expressed as (01, 10), and the coordinates of the region positioned in the row 2 and the column 4 may be expressed as (01, 11). The coordinates of the region positioned at the row 4 and column 4 may be expressed as (11, 11), and the coordinates of the region positioned at the row 512 and column 512 may be expressed as (111111111, 111111111). The entire bitmap configuration unit 212 may store each coordinate according to the position on the plane of the substrate SB.

The substrate SB, which is a printing target, may be a substrate for a display device, and may include pixels, which are a basic unit of a screen display. The pixels may be disposed to have a repeating pattern. The unit region determination unit 214 may analyze the repeating pattern on the substrate SB and designate a unit region UR according thereto. As shown in FIG. 4, the substrate SB may be divided into I regions having the same width along the first direction D1, and may be divided into J regions having the same width along the second direction D2. Accordingly, the substrate SB may include the I×J regions having the same size along the first direction D1 and the second direction D2. The I×J regions may have the same pattern, and one of the I×J regions may be designated as the unit region UR.

The length of the first direction D1 of the substrate SB may be about I times the length of the first direction D1 of the unit region UR. The length of the second direction D2 of the substrate SB may be about J times the length of the second direction D2 of the unit region UR. The substrate SB may include a display area for displaying a screen and a peripheral area adjacent to the display area. The length of the first direction D1 of the substrate SB may mean the length of the first direction D1 of the display area, and the length of the second direction D2 of the substrate SB may mean the length of the second direction D2 of the display area.

The unit region ink drop map creation unit 216 may configure the unit region UR as a unit bitmap. As shown in FIG. 5, the unit region ink drop map creation unit 216 may divide the unit region UR into a lattice shape along the first direction D1 and the second direction D2. The unit region UR may be divided into P regions having the same width along the first direction D1 and Q regions having the same width along the second direction D2. Accordingly, the unit region UR may include the P×Q regions having the same size along the first direction D1 and the second direction D2. Each of the P×Q regions is referred to as a unit quadrangle UQ. The unit quadrangle UQ may have a shape including two sides parallel to the first direction D1 and two sides parallel to the second direction D2. The size of the unit quadrangle UQ constituting the unit region UR may be substantially the same as the size of the region indicated by the coordinates of the entire bitmap.

The length of a side of the unit quadrangle UQ may be about 1 m or less, but embodiments are not limited thereto. The resolution of the unit region ink drop map may be changed according to the length of a side of the unit quadrangle UQ. The unit quadrangle UQ may be formed as a rectangle or a square. The length of the first direction D1 of the unit region UR may be about P times of the length of the first direction D1 of the unit quadrangle UQ. The length of the second direction D2 of the unit region UR may be approximately Q times of the length of the second direction D2 of the unit quadrangle UQ. P and Q may be a square number of two. P may be 2 to m square number ($P=2^m$), and Q may be 2 to n square number ($Q=2^n$).

Herein, m and n are natural numbers. m and n may be the same, and P and Q may be the same. For example, P and Q may be 16, which is the square number 4 of 2 ($2^2$), and the unit region UR may include 256 unit quadrangles UQ of 16×16.

The pixels R, G, and B may be positioned in the unit region UR. The pixels R, G, and B may include a first color pixel R, a second color pixel G, and a third color pixel B. The first color pixel R may display red, the second color pixel G may display green, and the third color pixel B may display blue. The pixels may further include pixels (e.g., white) that display colors other than red, green, and blue.

In an embodiment, two first color pixels R, four second color pixels G, and two third color pixels B may be positioned within the unit region UR. The second color pixel G in the unit region UR may be spaced by a certain interval (or certain distance) along the first direction D1 and the second direction D2. For example, the first color pixel R and the third color pixel B may be spaced apart from each other by a certain interval (or certain distance) along the first direction D1 and the second direction D2. The first color pixel R and the second color pixel G may be adjacent to the first direction D1 and the second direction D2 in an oblique direction. The second color pixel G and the third color pixel B may be adjacent to the first direction D1 and the second direction D2 in an oblique direction. The substrate SB may include the I×J regions, and the arrangement of the pixels R, G, and B within the I×J regions may be the same. The number and arrangement of the pixels R, G, and B positioned within the unit region UR may be variously changed or modified.

As shown in FIG. 6, the inkjet head 100 may be positioned on the unit region UR. The nozzles 121 may be arranged in an oblique direction with respect to the first direction D1 and the second direction D2. Some of the nozzles 121 may overlap any one of pixels R, G, and B, and some may not overlap the pixels R, G, and B. For example, it is possible to determine whether each nozzle 121 discharges the ink according to whether each nozzle 121 and the pixels R, G, and B overlap or not. In case that the first color ink is dropped, the nozzle 121 may discharge the ink at a position overlapping the first color pixel R, and may not discharge the ink at the remaining positions. In case that the second color ink is dropped, the nozzle 121 may discharge the ink at the position overlapping the second color pixel G, and may not discharge the ink at the remaining positions. In case that the third color ink is dropped, the nozzle 121 may discharge the ink at the position overlapping the third color pixel B, and may not discharge the ink at the remaining positions. Accordingly, the unit region ink drop map creation unit 216 may generate a first unit region ink drop map indicating the position where the first color ink is dropped to the first color pixel R, a second unit region ink drop map indicating the position where the second color ink is dropped to the second color pixel G, and a third unit region ink drop map indicating the position at which the third color ink is dropped to the third color pixel B, respectively. The generated drop map may be stored in a memory. For example, the derived first color ink, second color ink, and third color ink may form the color filter layer of the first color pixel R, the color filter layer of the second color pixel G, and the color filter layer of the third color pixel B, respectively.

As shown in FIG. 7, in case that the first color ink is dropped, it may be set so that the nozzles corresponding to the positions of the row 3 and the column 4, the row 4 and the column 3 to the column 5, the row 5 and the column 2 to the column 6, the row 6 and the column 2 to the column 6, the row 7 and the column 3 to the column 5, the row 8 and the column 4, the row 10 and the column 11, the row 11 and the column 10 to the column 12, the row 12 and the column 9 to the column 13, the row 13 and the column 9 to the column 13, the row 14 and the column 10 to the column 12, and the row 15 and the column 11 within the unit region UR discharge the first color ink. For example, the nozzles may be set in the same way as dropping the first color ink in case that the second color ink and the third color ink are dropped.

As shown in FIG. 8, the first unit region ink drop map may indicate whether the first color ink is discharged according to the coordinates in the unit region UR. The coordinates may be expressed as binary numbers. For example, in case that (10, 11), which are the binary coordinates corresponding to the row 3 and the column 4, are input, a signal of '1' may be output to discharge the ink. For example, in case that (11, 10), (11, 11), and (11, 100), which are the binary coordinates corresponding to the row 4 and the column 3 to the column 5, are input, a signal of '1' may be output to discharge the ink. Also, in case that (100, 01), (100, 10), (100, 11), (100, 100), and (100, 101), which are the binary coordinates corresponding to the row 5 and the column 2 to the column 6, are input, a signal of '1' may be output to discharge the ink. For example, in case that the binary coordinates corresponding to the row 6 and the column 2 to the column 6, the row 7 and the column 3 to the column 5, the row 8 and the column 4, the row 10 and the column 11, the row 11 and the column 10 to the column 12, the row 12 and the column 9 to the column 13, the row 13 and the column 9 to the column 13, the row 14 and the column 10 to the column 12, and the row 15 and the column 11 are input, a signal of '1' may be output to discharge the ink. Also, the binary coordinates corresponding to the remaining positions except for the row 3 and the column 4, the row 4 and the column 3 to the column 5, the row 5 and the column 2 to the column 6, the row 6 and the column 2 to the column 6, the row 7 and the column 3 to the column 5, the row 8 and the column 4, the row 10 and the column 11, the row 11 and the column 10 to the column 12, the row 12 and the column 9 to the column 13, the row 13 and the column 9 to the column 13, the row 14 and the column 10 to the column 12, and the row 15 and the column 11 are input, 0 may be output as a signal that the ink is not discharged. For example, the second unit region ink drop map and the third unit region ink drop map may be prepared in the same way as the first unit region ink drop map.

For example, the pre-processing unit 210 may store the coordinates corresponding to the entire region of the substrate SB and designate the unit region UR to generate the unit region ink drop map according to the ink color.

The nozzle coordinate analysis unit 220 may analyze each position of the nozzles 121. The inkjet head 100 may correspond to (or be disposed in) a certain position on the substrate SB, and each nozzle 121 may correspond to (or be disposed in) the certain coordinates on the entire bitmap of the substrate SB. The nozzle coordinate analysis unit 220 may receive the information about the coordinates of each position of the substrate SB from the entire bitmap configuration unit 212 of the pre-processing unit 210 and find the coordinates corresponding to each nozzle 121. For example, the nozzle coordinate analysis unit 220 may analyze the coordinates of the first direction D1 and the coordinates of the second direction D2 of each of the nozzles 121. The coordinates may be expressed as binary numbers. For example, in case that the nozzle 121 is in the position corresponding to the row 1000 and the column 1000 of the substrate SB, the coordinates of the nozzle 121 may be output as (1111100111, 1111100111).

The ink discharge determination unit 230 may receive the unit region ink drop map from the unit region ink drop map creation unit 216 of the pre-processing unit 210, and may receive the coordinates of the nozzle 121 from the nozzle coordinate analysis unit 220. The ink discharge determination unit 230 may determine whether the nozzle 121 discharges the ink from the received information. In case that the information on whether or not ink is discharged corresponding to the coordinates of the first direction D1 and the coordinates of the second direction D2 on the entire bitmap is stored, the operation time and memory capacity may increase. The inkjet printing apparatus 10 may store only the information on whether or not ink is discharged corresponding to the coordinates of the first direction D1 and the coordinates of the second direction D2 on the unit bitmap and may determine the ink discharge of the nozzle 121 by using only the lower partial bits of the coordinates corresponding to the position of the nozzle 121. The unit bitmap may include the P coordinates in the first direction D1 and the Q coordinates in the second direction D2, P may be configured as an m square number of 2 ($2^m$), and Q may be configured as an n square number of 2 ($2^n$). For example, the ink discharge determination unit 230 may associate the lower m bits of the coordinates of the first direction D1 and the lower n bits of the coordinates of the second direction D2 of each of the nozzles 121 to the unit region ink drop map to determine whether each of the nozzles 121 discharges the ink or not. Accordingly, the inkjet printing apparatus 10 may dramatically reduce the calculation time and memory capacity for determining whether the ink is discharged.

For example, in case that the first color ink is dropped, and the position of the nozzle 121 corresponds to the coordinates (10, 11), a signal of '1' may be output to discharge the ink. Since the substrate SB may be divided into the unit regions UR having the same pattern, in case that the unit region UR includes 16×16=256 unit quadrangles UQ, whether or not ink is discharged at the coordinates (0, 0) may be the same as whether or not ink is discharged at the coordinates (10000, 0), (1, 10000), (10000, 10000), and the like. Similarly, whether or not ink is discharged at the coordinates (10, 11) may be the same as whether or not ink is discharged at the coordinates (10010, 11), (10, 10011), (10010, 10011), (110010, 110011), and the like. Therefore, in case that the position of the nozzle 121 corresponds to the coordinates (10010, 11), (10, 10011), (10010, 10011), (110010, 110011), etc., a signal of '1' may be output to discharge the ink.

Each of the coordinates of the first direction D1 and the coordinates of the second direction D2 on the entire bitmap may consist of 32 bits. For example, by using the lower 4 bits of the coordinates of the first direction D1 and the lower 4 bits of the coordinates of the second direction D2 to determine whether the nozzle 121 discharges the ink or not, the operation time and memory capacity for determining whether or not to discharge ink may be greatly reduced.

As described above, the ink discharge determination unit 230 may determine whether the ink of the nozzles 121 is discharged or not. Each of the nozzles 121 may receive an output value for whether or not ink is discharged from the ink discharge determination unit 230, and according to the output value, some nozzles 121 may discharge the ink, and some nozzles 121 may not discharge the ink. In case that the ink discharge from the nozzles 121 of the inkjet head 100 is completed, the inkjet head 100 may be moved. The inkjet head 100 may be stopped after moving by a certain distance, and the nozzle coordinate analysis unit 220 may analyze the position of the nozzles 121 at the stopped point again. For example, the ink discharge determination unit 230 may determine again whether the ink of the nozzles 121 is discharged at the stopped point. Some of the nozzles 121 discharge the ink according to the re-determined output value of the ink discharge.

At a point where the inkjet head 100 is stationary, the time for analyzing the coordinates of each nozzles 121 and determining whether to discharge ink may be shorter than the time for discharging the ink at the corresponding point by the nozzles 121. Therefore, the process of discharging the ink and the calculation for deriving whether the ink is discharged at the next time may be performed simultaneously. Therefore, the running time of the inkjet printing process may be greatly shortened or reduced.

In the above-described embodiment, the case where m and n are 4 has been described as an example, but the values of m and n may be variously changed or modified. M and n may have different values. The values m and n may be appropriately selected in consideration of the size and resolution of the unit region UR.

In order to form the pattern of the pixels R, G, and B (hereinafter, the color filter layer is described as an example), in case that the inkjet head 100 moves across the substrate SB, the printing of the color filter layer may be performed as the nozzles 121 discharge the ink into the region where the color filter layer is formed. Here, the term "swath" is referred to as that the inkjet head 100 moves in a direction with printing from the first position to the second position. The color filter layer may be formed by swaths. For example Referring to FIG. 2, the inkjet head 100 may form the pattern (e.g., the color filter layer) by repeating the printing in the second direction D2 and the printing in the opposite direction to the second direction D2 several to tens of times.

Due to the difference between the pitch of pixels R, G, and B and the pitch of nozzles 121, the shape of the pixels R, G, and B, etc., the number of the nozzles 121 allocated (or disposed) to the pixels R, G, and B during one swath (i.e., the number of the nozzles 121 that may be used to print the color filter layer by being positioned corresponding to the corresponding pixels) may be different for each pixel. The number of swaths may be determined so that the nozzle 121 may form the color filter layer of the least allocated pixel, for example. For example, 10 swaths may be required to discharge 30 drops of the ink to the pixel to which an average of three nozzles 121 are assigned to one swath. For example, the pixel to which a lot of nozzles 121 are allocated form the color filter layer by discharging the ink by the nozzles 121 in the first swath, and the nozzles 121 may not discharge the ink in the later swath (since the color filter layer was formed in the previous swath). In order for the nozzles, which discharge the ink selected over swaths to be dispersed or evenly distributed without being concentrated (or unevenly distributed) in a specific swath, it is necessary to perform a separate operation for the nozzle selection dispersion during the nozzle selection operation.

Figure 9:
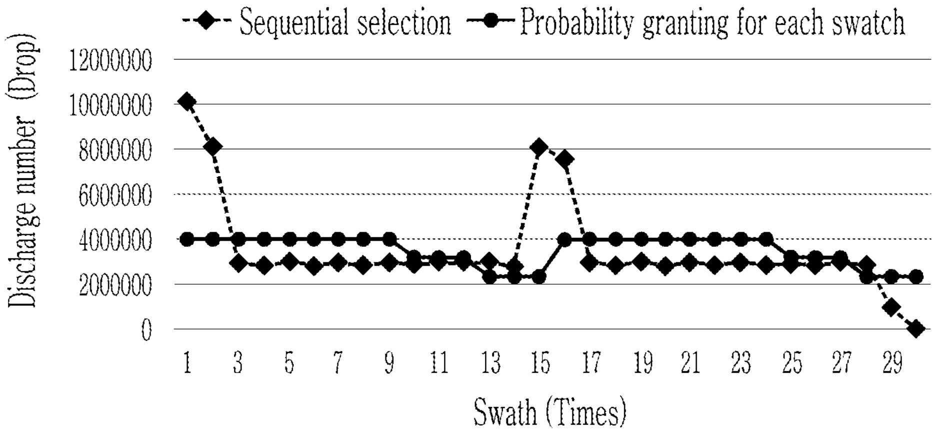
FIG. 9 is a graph showing a nozzle selection number for each swath during an inkjet printing process.

FIG. 9 is a graph showing a number of nozzle selections per each swath during an inkjet printing process.

Referring to FIG. 9, the first to fifteenth swaths are swaths used to print the region from the center portion of the substrate to an edge portion, and the sixteenth to thirtieth swaths are swaths used to print the region from the center portion of the substrate to the other edge portion. In case that a separate calculation is not performed during the nozzle selection calculation, the nozzles that discharge the ink to form the pattern on the substrate may be sequentially selected as the swath proceeds. Accordingly, the selected nozzles may be driven into the swath that advances first. For example, as shown in the graph for a sequential selection, about 10 million nozzles may discharge the ink in the first swath, and about 800,000 nozzles may discharge the ink in the second swath. From the next third swath, about 300,000 nozzles may discharge the ink. For example, the nozzles that discharge the ink may be concentrated in the first and second swaths, and from the third swath, only about 30% of the nozzles may discharge the ink compared to the number of the nozzles that discharged the ink in the first swath.

The nozzle selection probability (or a nozzle adoption rate) may be assigned to each swath so that the nozzles selected to discharge the ink are prevented from being concentrated in the initial swath and distributed over the entire swath. In case that the nozzle selection probability is given for each swath, the nozzle selection may be prevented from being concentrated on the initial swath because the nozzles are selected according to the probability in case that they are sequentially candidates. For example, in case that the number of nozzles to discharge the ink over 30 swaths is about 100 million, and the nozzle selection probability of about 0.04 (or 4%) is given to the first swath, about 4 million nozzles may be selected in the first swath. In case that the nozzle selection probability is given to each swath, as in the graph of the probability assigned to each swath in FIG. 9, the nozzle selection may be distributed over the entire swath, and the nozzle selection uniformity for each swath may be improved.

The nozzle selection probability for each swath may be based on the number of swaths. For example, in case that the number of swaths is 30, the nozzle selection probability for each swath may be about 1/30. However, the nozzle selection probability may not need to be the same for all swaths, and it may be individually determined for each swath in consideration of parameters such as the shape of the pattern to be formed and the nozzle pitch, and a weight value may be assigned to each swath. For example, the nozzle selection probability for each swath may be set individually for each swath or by grouping several swaths within a range of increasing or decreasing a reciprocal number of the swaths by about ±30% as shown in the equation below.

$$(1/\text{a swath number})\times 0.7 \le \text{a nozzle selection probability for each swath} \le (1/\text{a swath number})\times 1.3$$

In case that the nozzle selection probability of the swath is selected equally, the number of the ink discharges (i.e., the number of the ink discharges required to form the pattern to be printed) may not reach a calculated value even after the entire swath is completed. Therefore, a relatively high nozzle selection probability may be given at the beginning of the entire swath, and a relatively low nozzle selection probability may be given toward the later stage. For reference, the graph on the probability assignment for each swath shown in FIG. 9 is according to the data described in Table 1 below.

TABLE 1

| Swath No. | Probability for each swath | Nozzle selection number |
|---|---|---|
| 1 | 0.037879 | 3943182 |
| 2 | 0.037879 | 3943182 |
| 3 | 0.037879 | 3943182 |
| 4 | 0.037879 | 3943182 |
| 5 | 0.037879 | 3943182 |
| 6 | 0.037879 | 3943182 |
| 7 | 0.037879 | 3943182 |
| 8 | 0.037879 | 3943182 |
| 9 | 0.037879 | 3943182 |
| 10 | 0.030303 | 3154545 |
| 11 | 0.030303 | 3154545 |
| 12 | 0.030303 | 3154545 |
| 13 | 0.022727 | 2365909 |
| 14 | 0.022727 | 2365909 |
| 15 | 0.022727 | 2365909 |
| 16 | 0.037879 | 3943182 |
| 17 | 0.037879 | 3943182 |
| 18 | 0.037879 | 3943182 |
| 19 | 0.037879 | 3943182 |
| 20 | 0.037879 | 3943182 |
| 21 | 0.037879 | 3943182 |
| 22 | 0.037879 | 3943182 |
| 23 | 0.037879 | 3943182 |
| 24 | 0.037879 | 3943182 |
| 25 | 0.030303 | 3154545 |
| 26 | 0.030303 | 3154545 |
| 27 | 0.030303 | 3154545 |
| 28 | 0.022727 | 2365909 |
| 29 | 0.022727 | 2365909 |
| 30 | 0.022727 | 2365909 |

Figure 10:
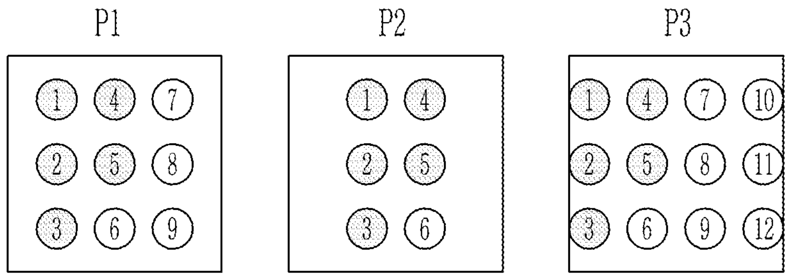
FIG. 10 and FIG. 11 are schematic views for nozzle selection in terms of a pixel during an inkjet printing process, respectively.
Figure 11:
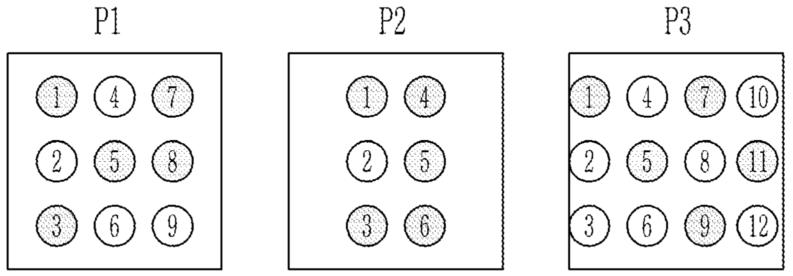

FIG. 10 and FIG. 11 are schematic views for a nozzle selection in terms of a pixel during an inkjet printing process, respectively. In case that the nozzle selection probability is given for each swath, some pixels may have the nozzle selection driven by the initial swath. Therefore, it may be necessary to select the distributed nozzle in consideration of the number of the allocations of all nozzles from a pixel point of view. In FIG. 10 and FIG. 11, a quadrangle represents the pixels P1, P2, and P3, and circles in the quadrangle indicates the nozzles assigned to each pixel P1, P2, and P3 over swaths to form the pattern (e.g., the color filter layer). The numbers in the circles indicate the order (or assignment sequence) in which they are quickly assigned in time. Nine nozzles may be assigned to the first pixel P1, six nozzles may be assigned to the second pixel P2, and twelve nozzles may be assigned to the third pixel P3, and it is assumed that the number of the selection of the nozzles, through which the ink is discharged for each pixel P1, P2, and P3, requires 5 times to form the pattern (e.g., the color filter layer) of the pixels P1, P2, and P3. Among the circles, the gray circle represents the nozzle selected to discharge the ink.

Referring to FIG. 10, in case that the nozzles are selected for each swath to form the pattern, according to a normal logic calculation, the first to fifth nozzles, which are temporally faster in each pixel P1, P2, and P3, may be selected to discharge the ink. For example, in case that swaths are performed for the pixel to which the smallest number of nozzles is allocated, the nozzles selected for the pattern formation of the pixels P1, P2, and P3 may be concentrated in the swath that proceeds first. In case that the nozzle selection is focused on the initial swath, it may cause defects such as staining in the display device.

Referring to FIG. 11, by giving the nozzle selection probability to each pixel, the selected nozzles may be evenly and/or randomly distributed over the entire swath. In the illustrated example, for the nozzles, the first, third, fifth, seventh, and eighth nozzles may be selected in the first pixel P1, the first and third to sixth nozzles may be selected in the second pixel P2, and the first, fifth, seventh, ninth, and eleventh nozzle may be selected in the third pixel P3. For example, the selected nozzles may be distributed over the entire swath.

Figure 12:
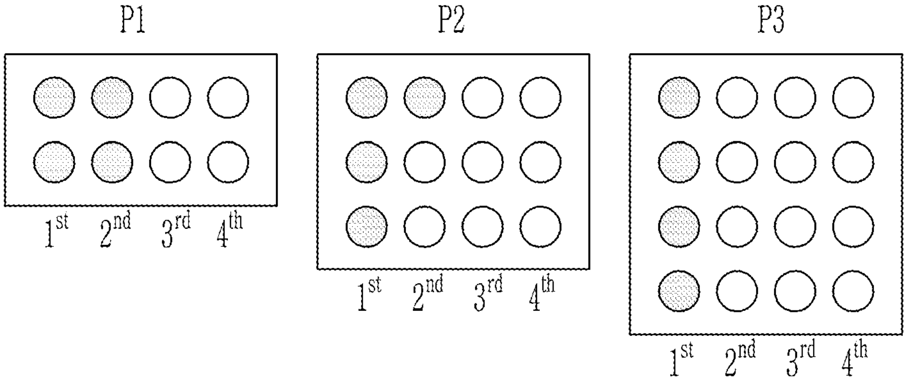
FIG. 12 and FIG. 13 are schematic views of nozzle selection for each swath during an inkjet printing process, respectively.
Figure 13:
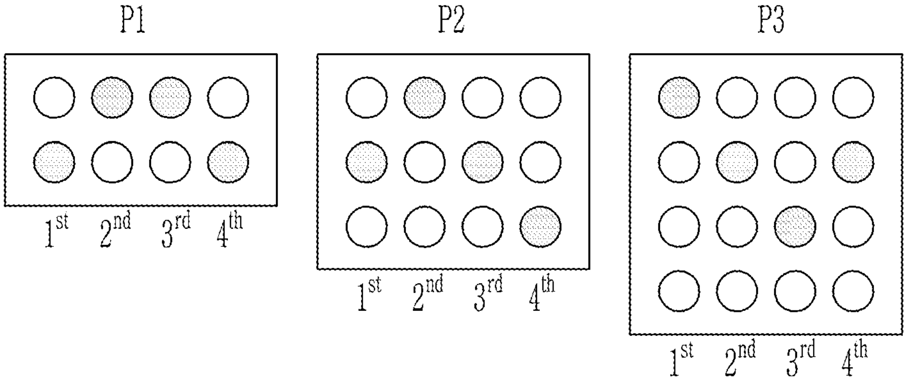

The above-mentioned concept of the nozzle selection probability for each pixel is described in another way with reference to FIG. 12 and FIG. 13.

FIG. 12 and FIG. 13 are schematic views of nozzle selection for each swath during an inkjet printing process, respectively.

In FIG. 12 and FIG. 13, the quadrangle represents the pixels P1, P2, and P3, and the circle in the quadrangle represents the swath where the nozzle that discharges the ink to the pixels P1, P2, and P3 is selected from among 4 swaths (e.g., first to fourth swaths). It is assumed that two nozzles are allocated to the first pixel P1, three nozzles are allocated to the second pixel P2, and four nozzles are allocated to the third pixel P3 for each swath. For example, it is assumed that the number of the selection of the nozzle, through which the ink is discharged, requires 4 times for each pixel P1, P2, and P3 in order to form the pattern (e.g., the color filter layer) of the pixels P1, P2, and P3.

Referring to FIG. 12, in case that the nozzles are selected sequentially across the swath to form the pattern, for the first pixel P1, all the nozzles may be selected in the first and second swaths in case that swathing is performed 4 times. Since the required amount of the discharged ink is discharged in the first and second swaths, the nozzles may not be selected in the third and fourth swaths. For the second pixel P2, all the nozzles may be selected in the first swath, and one of the nozzles may be selected in the second swath. Since the required amount of the discharged ink is discharged in the first and second swaths, the nozzles may not be selected in the third and fourth swaths. For the third pixel P3, all the nozzles may be selected in the first swath. Since the required amount of the discharged ink is discharged in the first swath, the nozzles may not be selected in the second to fourth swaths. As such, there may be differences in the swath in which the nozzles are selected according to the number of the nozzles allocated to the pixels P1, P2, and P3, but all may be sequentially selected according to the proceeding sequence of the swath.

Referring to FIG. 13, in case that the nozzle selection probability is given to each pixel, the selected nozzles may be distributed evenly and/or randomly over the entire swath. For example, as shown, for each pixel P1, P2, and P3, one nozzle may be selected for each swath. For example, in order to ensure that nozzle selection is evenly distributed over the entire swath, the different nozzle selection probabilities may be assigned to each pixel P1, P2, and P3.

For example, the nozzle selection probability for each pixel may be calculated by dividing the number of nozzles to be selected (i.e., the number of the nozzles discharging the ink required to form the pattern of the pixels P1, P2, and P3) by the number of the nozzles allocated over the entire swath. For example, for the first pixel P1, since eight nozzles are allocated in the swath of four times and four nozzles are selected, in case that the probability of ½ is given to each nozzle assigned during the nozzle selection for each swath, the nozzle selection may be evenly distributed over the entire swath. For the second pixel P2, twelve nozzles are allocated in the swath of four times and the four nozzles are selected, and in case that the probability of ⅓ is given to each nozzle assigned during the nozzle selection for each swath, the nozzle selection may be evenly distributed over the entire swath. For the third pixel P3, since 16 nozzles are allocated in the swath of four times and four nozzles are selected, in case that the probability of ¼ is given to each nozzle assigned during the nozzle selection for each swath, the nozzle selection may be evenly distributed over the entire swath. These probability values are examples and may be variously changed.

For example, the nozzle selection probability for each pixel is set differently for each swath within the range of increasing or decreasing by about ±30% for the value obtained by dividing the number of the nozzles discharging the ink required for the pattern formation of the pixels P1, P2, and P3 by the number of the nozzles allocated over the entire swath. For example, by setting a weight value for each swath, the selection nozzle may be evenly distributed over the entire swath, and as described above, the number of the ink discharges may be prevented from being less than the calculated value.

The nozzle selection probability may be performed by the nozzle selection probability granting unit 240 of the controller 200. The ink discharge determination unit 230 may determine whether each nozzle has the ink discharge based on the nozzle selection probability for each swath or for each pixel provided by the nozzle selection probability granting unit 240, e.g., may perform the nozzle selection calculation. The nozzle selection probability granting unit 240 may prepare a probability map for each swath or each pixel and transmit the probability map to the ink discharge determination unit 230. The ink discharge determination unit 230 may output the signal of '1' as a signal indicating that the ink is discharged or may output the signal of '0' as a signal indicating that ink is not discharged by reflecting the nozzle selection probability included in the probability map in case that it is determined whether each nozzle has the ink discharge. By preprocessing the probability map for each pixel, the uniformity for each pixel may be secured without increasing the calculation time of this logic.

As above, by giving the nozzle selection probability per swath or per pixel so that the nozzle selection is not concentrated on the initial swath, even without performing a separate calculation for selecting the nozzle selection timing, the nozzle selection may be distributed based on the probability. Since it is not necessary to perform a separate calculation for distributing nozzle selection, the calculation time and the memory capacity may be reduced.

Hereinafter, an inkjet printing method according to an embodiment is described with reference to FIG. 14.

Figure 14:
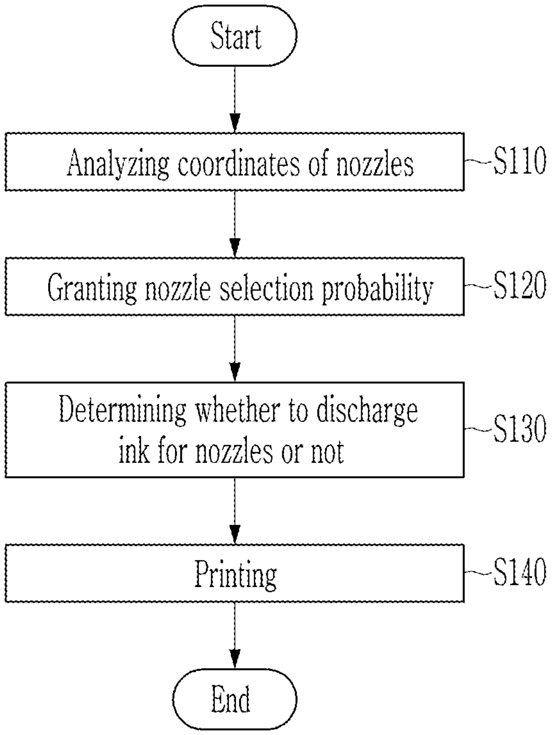
FIG. 14 is a flowchart showing an inkjet printing method according to an embodiment.

FIG. 14 is a flowchart showing an inkjet printing method according to an embodiment.

Referring to FIG. 14 together with FIG. 3, in the inkjet printing method, on the basis of information of a substrate to be printed, a step S110 of analyzing the coordinates of the nozzles for the substrate may be performed. In case that the inkjet head corresponds to a certain position on the substrate, the nozzles may correspond to certain coordinates on the entire bitmap of the substrate. A coordinate analysis of the nozzles may be performed by the nozzle coordinate analysis unit 220 of the controller 200. The nozzle coordinate analysis unit 220 may determine the number of the swaths and the number of the ink discharge nozzles required to form the patterns based on the coordinates of the nozzles and the information of the pattern to be formed on the substrate. For example, the nozzle coordinate analysis unit 220 may calculate which nozzles are assigned to form the pattern, and generate an ink drop map for the substrate region corresponding to the swath (i.e., the region of the substrate through which the nozzles of the inkjet head pass during the swath).

For example, a step (S120) of giving the nozzle selection probability based on the nozzle coordinate analysis result may be performed, and the nozzle selection probability may be given per swath or per pixel. The nozzle selection probability may be performed by the nozzle selection probability granting unit 240. The nozzle selection probability granting unit 240 may generate a probability map per swath or per pixel.

For example, a step (S130) of determining whether to discharge the ink of the nozzles based on the ink drop map and the nozzle selection probability map may be performed. The determination of whether the nozzles discharge the ink or not may be performed by the ink discharge determination unit 230. The ink discharge determination unit 230 may output the signal of '1' as a signal that the ink is discharged or the signal of '0' as a signal that the ink is not discharged, by applying the nozzle selection probability included in the probability map in case that it is determined whether each nozzle has the ink discharge or not. The ink drop map may be an ink drop map for the substrate region corresponding to the swath that may be provided from the nozzle coordinate analysis unit 220. The ink drop map may be an ink drop map for a unit region that may be provided from the aforementioned pre-processing unit 210.

For example, a printing step (S140) of forming the pattern on the substrate based on the signal output from the ink discharge determination unit 230 may be performed.

Hereinafter, a display device including the pattern or the layer that is formed by the inkjet printing apparatus according to an embodiment is briefly described.

Figure 15:
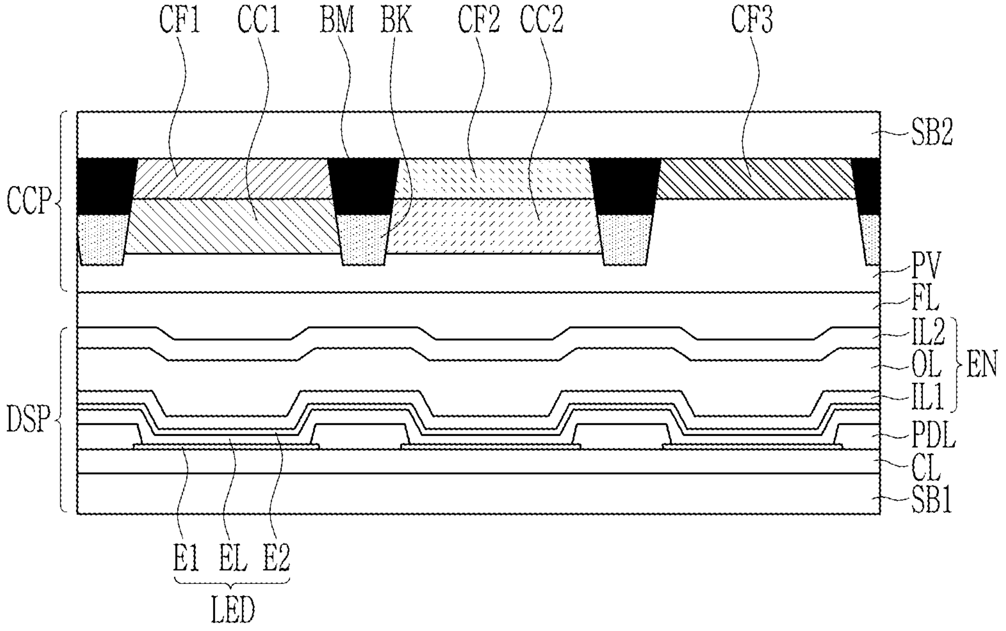
FIG. 15 is a schematic cross-sectional view showing a display device according to an embodiment.

FIG. 15 is a schematic cross-sectional view showing a display device according to an embodiment.

Referring to FIG. 15, the display device according to an embodiment may include a display unit DSP and a color conversion unit CCP positioned on the display unit DSP or facing the display unit DSP. The display unit DSP and the color conversion unit CCP may be attached, or the color conversion unit CCP may be laminated on the display unit DSP. A filling layer FL including a filling material may be positioned between the display unit DSP and the color conversion unit CCP.

The display unit DSP may include a substrate SB1 and layers and elements positioned over the substrate SB1. The substrate SB1 may include an insulating material such as glass or plastic.

A circuit layer CL may be positioned on the substrate SB1. The circuit layer CL may include elements for driving the pixels of the display device, such as transistors, capacitors, and wires. For example, the circuit layer CL may include insulating layers for configuring the elements or insulating between the elements. The elements may include a conductive layer that may include a metal such as aluminum (Al), copper (Cu), titanium (Ti), or molybdenum (Mo), and may include a semiconductor layer that may include polysilicon, amorphous silicon, an oxide semiconductor, etc. The insulating layers may include an inorganic insulating layer including an inorganic insulating material such as a silicon oxide, a silicon nitride, and a silicon oxynitride, and/or an organic insulating layer including an organic insulating material such as an imide-based polymer, an acryl-based polymer, and a siloxane-based polymer.

Light emitting diodes LED may be positioned on the circuit layer CL. The light emitting diodes LED may form the pixels of the display device. Each light emitting diode LED may include a first electrode E1, an emission layer EL, and a second electrode E2. Although three light emitting diodes LED are shown, the display device may include a light emitting diode LED matching the resolution.

The first electrode E1 may be connected (e.g., electrically connected) to the transistor included in the circuit layer CL. The first electrode E1 may include a metal such as silver (Ag), lithium (Li), calcium (Ca), aluminum (Al), magnesium (Mg), or gold (Au). The pixel conductive layer may include a transparent conductive oxide (TCO) such as an indium tin oxide (ITO) or an indium zinc oxide (IZO).

A pixel defining layer PDL may be positioned on the first electrode E1. The pixel defining layer PDL may have an opening overlapping the first electrode E1. The pixel defining layer PDL may include an organic insulating material.

The emission layer EL may be positioned over the first electrode E1 and the pixel defining layer PDL. The emission layer EL may be in contact with the first electrode E1 through the opening of the pixel defining layer PDL. The emission layer EL may include a light emitting material that emits blue light. The emission layer EL may include a light emitting material that emits red light or green light in addition to blue light.

The second electrode E2 may be positioned on the emission layer EL. The second electrode E2 may include a metal such as calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), and lithium (Li). The second electrode E2 may include a transparent conductive oxide (TCO) such as an indium tin oxide (ITO) or an indium zinc oxide (IZO).

The first electrode E1 may be included individually for each pixel to receive a driving current. The second electrode E2 may be included in common to the pixels to receive a common voltage. The first electrode E1 may be referred to as a pixel electrode, and the second electrode E2 may be referred to as a common electrode. The first electrode E1 may be an anode of the light emitting diode LED, and the second electrode E2 may be a cathode of the light emitting diode LED.

An encapsulation layer EN may be positioned on the second electrode E2. The encapsulation layer EN may be a thin film encapsulation layer including inorganic insulating layers IL1 and TL2 and an organic insulating layer OL.

The filling layer FL may be positioned on the encapsulation layer EN, and the color conversion unit CCP may be positioned on the filling layer FL.

The color conversion unit CCP may include a substrate SB2. The substrate SB2 may include an insulating material such as glass or plastic.

A light blocking member BM and color filter layers CF1, CF2, and CF3 may be positioned on the substrate SB2. The light blocking member BM may overlap the pixel defining layer PDL of the display unit DSP. The light blocking member BM may not overlap the aperture of the pixel defining layer PDL, which is the light emitting region. The light blocking member BM may be positioned between the neighboring color filter layers CF1, CF2, and CF3. The light blocking member BM may include a black pigment or dye, and may reduce or prevent light reflection due to the metal layer of the display unit DSP. The color filter layers CF1, CF2, and CF3 may overlap the opening of the pixel defining layer PDL. The color filter layers CF1, CF2, and CF3 may include a red color filter layer CF1 that transmits red light, a green color filter layer CF2 that transmits green light, and a blue color filter layer CF3 that transmits blue light. The color filter layers CF1, CF2, and CF3 may be formed by using the inkjet printing apparatus described above.

A bank BK may be positioned on the light blocking member BM. The bank BK may overlap the pixel defining layer PDL. The bank BK may partition the pixel area. The bank BK may include an organic insulating material. In the illustrated embodiment, the color conversion unit CCP may not include the light blocking member BM. For example, the color filter layers CF1, CF2, and CF3 may overlap to form a light blocking region. An overlapping part of the color filter layers CF1, CF2, and CF3 may be positioned between the substrate SB2 and the bank BK.

Color conversion layers CC1 and CC2 may be positioned on the color filter layers CF1 and CF2. The color conversion layers CC1 and CC2 may be positioned in a space defined by the bank BK. The color conversion layers CC1 and CC2 may include a red color conversion layer CC1 and a green color conversion layer CC2. The red color conversion layer CC1 may overlap the red color filter layer CF1, and the green color conversion layer CC2 may overlap the green color filter layer CF2. The color conversion layers CC1 and CC2 may be formed by using the inkjet printing apparatus described above.

The red color conversion layer CC1 and the green color conversion layer CC2 may include different semiconductor nanocrystals. For example, blue light incident on the red color conversion layer CC1 may be converted into red light by the semiconductor nanocrystal included in the red color conversion layer CC1 such that the red light is emitted.

The semiconductor nanocrystal may include phosphors and/or quantum dots that convert incident blue light into red light or green light. Quantum dots may control a color phase of light emitted according to a particle size, and accordingly, the quantum dots may emit light of various colors, such as blue, red, and green.

On the blue color filter layer CF3, the transmission layer may or may not be positioned instead of the color conversion layers CC1 and CC2. The transmission layer may include a polymer material capable of transmitting blue light.

A passivation layer PV may be positioned on the color conversion layers CC1 and CC2. The passivation layer PV may include an inorganic insulating material or an organic insulating material.

In concluding the detailed description, those skilled in the art will appreciate that many variations and modifications may be made to the embodiments without substantially departing from the principles and spirit and scope of the disclosure. Therefore, the disclosed embodiments are used in a generic and descriptive sense only and not for purposes of limitation.

What is claimed is:

1. An inkjet printing apparatus comprising:

an inkjet head including nozzles that discharge ink; and a controller that controls to discharge the ink by the nozzles, wherein the controller includes:

a nozzle coordinate analyzer that analyzes coordinates of the nozzles based on a substrate;

a nozzle selection probability grantor that assigns a nozzle selection probability of the nozzles, the nozzle selection probability that how likely the nozzles are selected to discharge the ink; and an ink discharge determinator that determines whether to discharge the ink or not based on the nozzle selection probability.

2. The inkjet printing apparatus of claim 1, wherein the nozzle coordinate analyzer determines a number of swaths and a number of ink discharge nozzles required to form patterns based on the coordinates of the nozzles and information of a pattern to be formed on the substrate.

3. The inkjet printing apparatus of claim 2, wherein the nozzle selection probability grantor generates a nozzle selection probability map for each swath by assigning a nozzle selection probability for each swath, and transmits the nozzle selection probability map to the ink discharge determinator.

4. The inkjet printing apparatus of claim 3, wherein the nozzle selection probability per swath is based on the number of the swaths.

5. The inkjet printing apparatus of claim 4, wherein the nozzle selection probability for each swath is set individually for each swath within a range that increases or decreases the number of the swaths by about ±30%.

6. The inkjet printing apparatus of claim 2, wherein the patterns are patterns of pixels, and the nozzle selection probability grantor generates a nozzle selection probability map for each pixel by assigning a nozzle selection probability to each pixel, and transmits the nozzle selection probability map to the ink discharge determinator.

7. The inkjet printing apparatus of claim 6, wherein the nozzle selection probability for each pixel is based on a value obtained by dividing the number of the nozzles discharging the ink required for forming the patterns of the pixels by the number of the nozzles allocated over the swaths.

8. The inkjet printing apparatus of claim 7, wherein the nozzle selection probability for each pixel is set differently for each swath within a range that increases or decreases a value obtained by dividing the number of ink discharge nozzles required for forming the patterns of the pixels by the number of nozzles allocated over the swaths by about ±30%.

9. The inkjet printing apparatus of claim 3, wherein the nozzle coordinate analyzer calculates which the nozzles are assigned to form the pattern and generate an ink drop map for a region of the substrate corresponding to each swath to be transmitted to the ink discharge determinator.

10. The inkjet printing apparatus of claim 9, wherein the ink discharge determinator determines whether to drop the ink based on the ink drop map and the nozzle selection probability map.

11. An inkjet printing method comprising:

analyzing coordinates of nozzles based on a substrate;

assigning a nozzle selection probability to the nozzles, the nozzle selection probability that how likely the nozzles are selected to discharge ink; and determining whether to discharge the ink or not based on the nozzle selection probability.

12. The inkjet printing method of claim 11, wherein the analyzing of the coordinates of the nozzles includes determining a number of swaths and a number of ink discharge nozzles required to form patterns based on the coordinates of the nozzles and information of a pattern to be formed on the substrate.

13. The inkjet printing method of claim 12, wherein
the assigning of the nozzle selection probability includes generating a nozzle selection probability map for each swath by assigning a nozzle selection probability to each swath.

14. The inkjet printing method of claim 13, wherein
the nozzle selection probability per swath is based on the number of the swaths.

15. The inkjet printing method of claim 14, wherein
the nozzle selection probability for each swath is set individually for each swath within a range that increases or decreases the number of the swaths by about ±30%.

16. The inkjet printing method of claim 12, wherein
the patterns are patterns of pixels, and
the assigning of the nozzle selection probability includes generating a nozzle selection probability map for each pixel by assigning the nozzle selection probability to each pixel.

17. The inkjet printing method of claim 16, wherein
the nozzle selection probability for each pixel is based on a value obtained by dividing the number of the nozzles discharging the ink required for forming the patterns of the pixels by the number of the nozzles allocated over the swaths.

18. The inkjet printing method of claim 17, wherein
the nozzle selection probability for each pixel is set differently for each swath within a range that increases or decreases a value obtained by dividing the number of ink discharge nozzles required for forming the patterns of the pixels by the number of nozzles allocated over the swaths by about ±30%.

19. The inkjet printing method of claim 13, wherein
the analyzing of the coordinate of the nozzles includes generating an ink drop map for a region of the substrate corresponding to each swath by calculating the nozzles assigned to the pattern to be formed.

20. The inkjet printing method of claim 19, wherein
the determining whether to discharge the ink or not includes determining whether to drop the ink based on the ink drop map and the nozzle selection probability map.

* * * * *